(12) United States Patent
Kim et al.

(10) Patent No.: US 11,500,240 B2
(45) Date of Patent: Nov. 15, 2022

(54) DISPLAY PANEL COMPRISING A FIRST SEALING LAYER COVERING A COLOR FILTER AND A SECOND SEALING LAYER COVERING A COLOR CONTROL LAYER AND A STEP COMPENSATING LAYER

(71) Applicant: Samsung Display Co., Ltd., Yongin-Si (KR)

(72) Inventors: Jeongki Kim, Hwaseong-si (KR); Jang-Il Kim, Asan-si (KR); Jong-Hoon Kim, Seoul (KR); YeoGeon Yoon, Suwon-si (KR); Seok-Joon Hong, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 325 days.

(21) Appl. No.: 16/788,675

(22) Filed: Feb. 12, 2020

(65) Prior Publication Data
US 2020/0301197 A1 Sep. 24, 2020

(30) Foreign Application Priority Data
Mar. 21, 2019 (KR) .................. 10-2019-0032247

(51) Int. Cl.
*G02F 1/1335* (2006.01)
*G02F 1/25* (2006.01)

(52) U.S. Cl.
CPC .......... *G02F 1/133514* (2013.01); *G02F 1/25* (2013.01)

(58) Field of Classification Search
CPC ..... G02F 1/25; G02F 2201/48; G02F 2201/54
See application file for complete search history.

(56) References Cited

U.S. PATENT DOCUMENTS

| | | | |
|---|---|---|---|
| 2010/0079694 A1* | 4/2010 | Yoshida | G02F 1/134363 349/40 |
| 2010/0128208 A1* | 5/2010 | Kurasawa | G02F 1/134363 349/143 |
| 2010/0163879 A1* | 7/2010 | Jung | G02F 1/13454 438/30 |

(Continued)

FOREIGN PATENT DOCUMENTS

| | | |
|---|---|---|
| KR | 1020130015737 A | 2/2013 |
| KR | 1020170039064 A | 4/2017 |

(Continued)

*Primary Examiner* — Paul C Lee
(74) *Attorney, Agent, or Firm* — Cantor Colburn LLP

(57) ABSTRACT

A display panel includes a first substrate which includes a display device and a second substrate which is disposed on the first substrate. The second substrate covers a base layer, a color filter layer, a first sealing layer, a color control layer, a step compensating layer, and a second sealing layer. The base layer includes a display area and a non-display area adjacent to the display area. The color filter layer overlaps the display area in a plan view, and is disposed under the base layer. The first sealing layer covers the color filter layer. The color control layer overlaps the display area in the plan view, and is disposed under the first sealing layer. The step compensating layer overlaps the non-display area in the plan view, and is disposed under the base layer. The second sealing layer covers the color control layer and the step compensating layer.

18 Claims, 10 Drawing Sheets

(56) References Cited

U.S. PATENT DOCUMENTS

| | | | | |
|---|---|---|---|---|
| 2013/0278858 A1* | 10/2013 | Hashimoto | ....... | G02F 1/133512 |
| | | | | 445/25 |
| 2013/0330858 A1* | 12/2013 | Shiromoto | ........ | G02F 1/134336 |
| | | | | 438/27 |
| 2015/0346526 A1* | 12/2015 | Chen | ................. | G02F 1/133345 |
| | | | | 349/46 |
| 2018/0275461 A1 | 9/2018 | Park et al. | | |
| 2020/0266253 A1 | 8/2020 | Kim et al. | | |

FOREIGN PATENT DOCUMENTS

| | | | |
|---|---|---|---|
| KR | 1020180107443 A | 10/2018 | |
| KR | 1020200100910 A | 8/2020 | |

\* cited by examiner

DISPLAY PANEL COMPRISING A FIRST SEALING LAYER COVERING A COLOR FILTER AND A SECOND SEALING LAYER COVERING A COLOR CONTROL LAYER AND A STEP COMPENSATING LAYER

This application claims priority to Korean Patent Application No. 10-2019-0032247, filed on Mar. 21, 2019, and all the benefits accruing therefrom under 35 U.S.C. § 119, the content of which in its entirety is herein incorporated by reference.

BACKGROUND

1. Field

Exemplary embodiments of the invention herein relate to a display panel, and more particularly, to a display panel with improved reliability.

2. Description of the Related Art

A display panel may include a transmissive display panel which selectively transmits source light generated by a light source, and may include a light emission type display panel which generates source light by the display panel itself. The display panel may include a color control layer for displaying different types of colors depending on pixels to generate a color image. The color control layer may selectively transmit only a portion of a wavelength range of the source light or may convert a color of the source light. Some of the color control layers may change characteristics of the source light while not changing the color of the source light.

SUMMARY

Exemplary embodiments of the invention provide a display panel with improved reliability.

An exemplary embodiment of the invention provides a display panel including: a first substrate which includes a display device, and a second substrate which is disposed on the first substrate, where the second substrate covers a base layer, a color filter layer, a first sealing layer, a color control layer, a step compensating layer, and a second sealing layer. The base layer may include a display area and a non-display area adjacent to the display area. The color filter layer may overlap the display area in a plan view, and may be disposed under the base layer. The first sealing layer may cover the color filter layer. The color control layer may overlap the display area in the plan view, and may be disposed under the first sealing layer. The step compensating layer may overlap the non-display area in the plan view, and may be disposed under the base layer. The second sealing layer may cover the color control layer and the step compensating layer.

In an exemplary embodiment, the color filter layer may include a first color filter layer, a second color filter layer, and a third color filter layer.

In an exemplary embodiment, the step compensating layer may include a same material as any one of materials of the first to third color filter layers.

In an exemplary embodiment, the color control layer may include a first wavelength conversion layer including a first emitting material, a second wavelength conversion layer including a second emitting material, and a transmission layer.

In an exemplary embodiment, the step compensating layer may include a same material as any one of materials of the first wavelength conversion layer and the second wavelength conversion layer.

In an exemplary embodiment, the step compensating layer may be spaced apart from the color control layer.

In an exemplary embodiment, the step compensating layer may include a first layer disposed under the base layer and a second layer disposed under the first layer.

In an exemplary embodiment, a width of the first layer may be greater than a width of the second layer.

In an exemplary embodiment, the first layer may include a same material as any one of materials of the first to third color filter layers, and the second layer may include a same material as another one of the materials of the first to third color filter layers.

In an exemplary embodiment, the first layer may include the same material as any one of materials of the first to third color filter layers, and the second layer may include the same material as any one of materials of the first and second wavelength conversion layers.

In an exemplary embodiment, the first sealing layer may be disposed between the first layer and the second layer.

In an exemplary embodiment, the second substrate may further include a first light blocking layer which overlaps the non-display area in the plan view, and is disposed under the second sealing layer.

In an exemplary embodiment, the second substrate may further include a second light blocking layer which overlaps the display area in the plan view, and is disposed under the second sealing layer.

In an exemplary embodiment, the step compensating layer may be disposed between the first sealing layer and the second sealing layer.

In an exemplary embodiment, the step compensating layer may be disposed between the first sealing layer and the base layer.

In an exemplary embodiment, the step compensating layer may be covered by the first sealing layer and the second sealing layer.

In an exemplary embodiment, a maximum distance from the base layer to the second sealing layer in the display area may be longer than a maximum distance from the base layer to the second sealing layer in the non-display area.

In an exemplary embodiment, the display panel may further include a light blocking portion disposed between the step compensating layer and the base layer.

In an exemplary embodiment of the invention, a display panel includes: a base layer, a color control layer, a step compensating layer, and a sealing layer. The base layer may include a display area and a non-display area adjacent to the display area. The color control layer may overlap the display area in a plan view, and may be disposed under the base layer. The step compensating layer may overlap the non-display area in the plan view, and may be disposed under the base layer. The sealing layer may cover the color control layer and the step compensating layer. A maximum distance from the base layer to the sealing layer in the display area may be longer than a maximum distance from the base layer to the sealing layer in the non-display area.

In an exemplary embodiment, the display panel may further include a light blocking layer disposed under the sealing layer.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
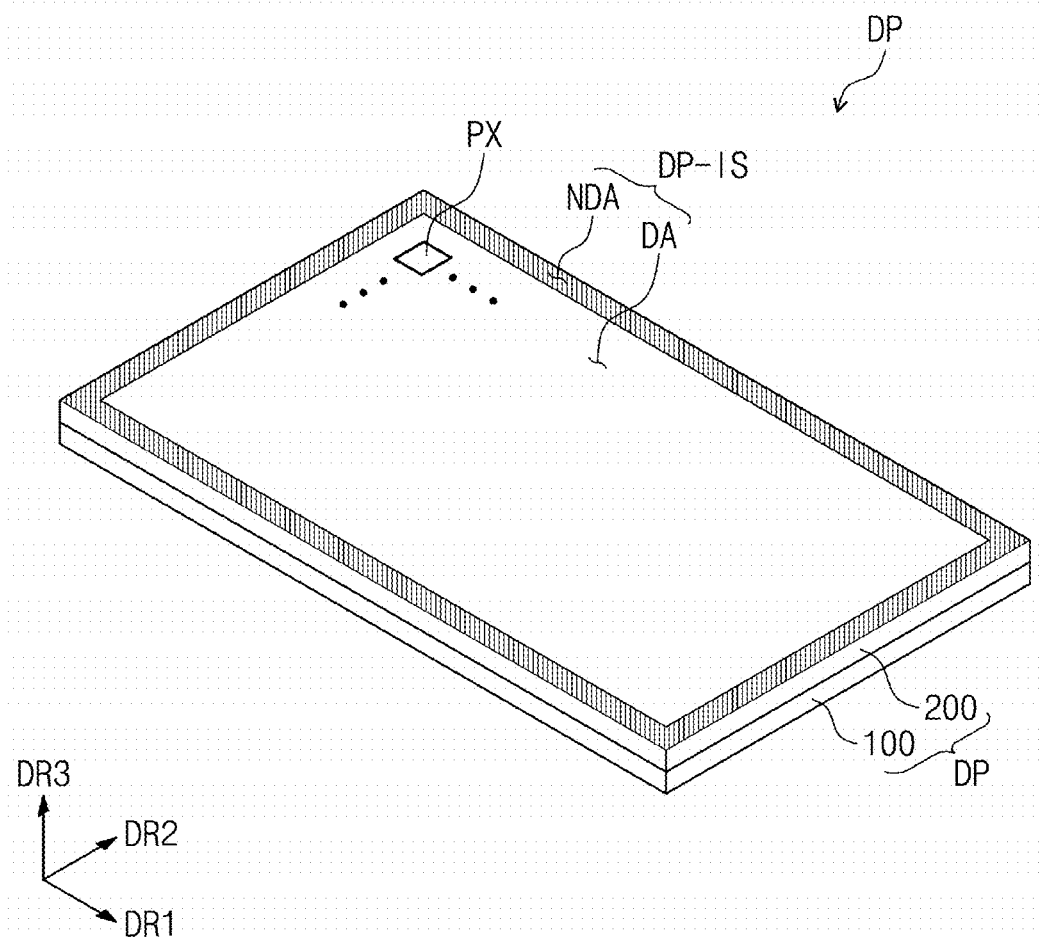
FIG. 1 is a perspective view of an exemplary embodiment of a display panel according to the invention.

It will be understood that when an element (or region, layer, portion, etc.) is referred to as being "on", "connected to" or "coupled to" another element, it can be directly on, connected or coupled to the other element or layer or intervening elements may also be present.

Like numbers refer to like elements throughout. The thickness and the ratio and the dimension of the element are exaggerated for effective description of the technical contents.

The term "and/or" includes any and all combinations of one or more of the associated listed items.

The terms first and second may be used to describe various elements, however, the elements should not be limited by these terms. These terms are merely used for the purpose of discriminating one element from another element. For example, the first element may be designated as the second element, and similarly, the second element may also be designated as the first element, without departing from the spirit or scope of the invention. A singular form, otherwise indicated, include a plural form.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Further, the terms "under", "below", "on", "above", and the like, may be used herein for ease of description to describe one element or feature's relationship to another element(s) or feature(s) as illustrated in the drawing figures. It will be understood that the terms are relative concept, and described on the basis of the direction illustrated in the drawing figures.

Unless otherwise defined, all terms (including technical and scientific terms) used herein have the same meaning that is generally understood by a person skilled in the art. It will be further understood that the terms such as defined terms in commonly the dictionary should be considered to have the same meaning as the contextual meaning of the related art, and, unless understood abnormally or excessively formal meaning, should be expressly defined herein.

In the description, it should be understood that the term "comprise" or "have" intends to mean that there may be specified features, numerals, steps, operations, elements, parts, or combinations thereof, not excluding the possibility of the presence or addition of the specified features, numerals, steps, operations, elements, parts, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described with reference to the drawings.

Figure 2:
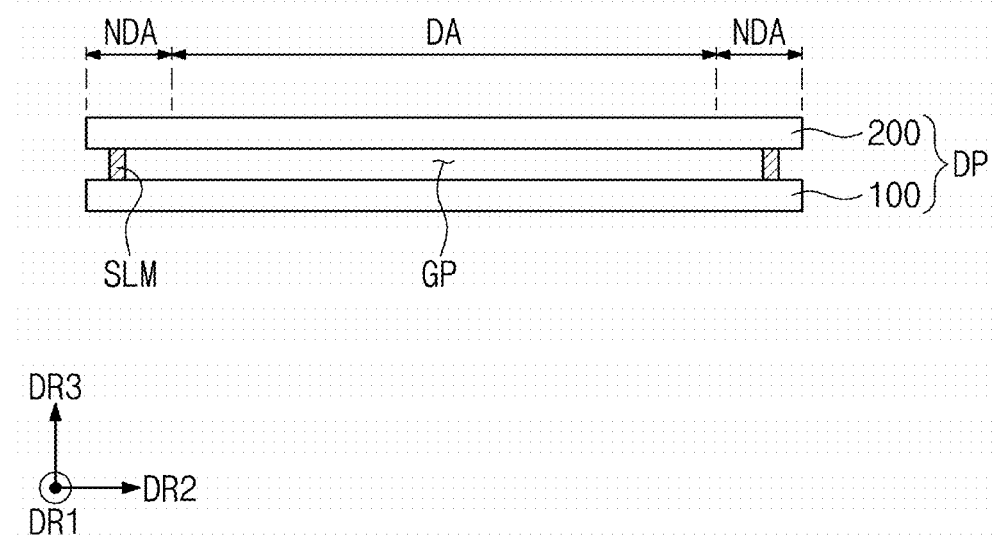
FIG. 2 is a cross-sectional view of an exemplary embodiment of a display panel according to the invention.

FIG. 1 is a perspective view of an exemplary embodiment of a display panel according to the invention, and FIG. 2 is a cross-sectional view of an exemplary embodiment of a display panel according to the invention.

Referring to FIGS. 1 and 2, the display panel DP may include a light-receiving display panel or a light-emitting display panel. The light-receiving display panel may be, for example, a liquid crystal display panel. In an exemplary embodiment, the light-emitting display panel may be, for example, an organic light-emitting display panel or a quantum dot light-emitting display panel. In an exemplary embodiment, an emission layer of the organic light-emitting display panel may include an organic light-emitting material. In an exemplary embodiment, an emission layer of the quantum dot light-emitting display panel may include a quantum dot, a quantum rod, etc. However, these are merely examples, and a display panel DP of the invention is not particularly limited.

The display panel DP may include a first substrate 100 (or a lower substrate) and a second substrate 200 (or an upper substrate) which faces the first substrate 100 and is spaced apart from the first substrate 100. A predetermined cell gap GP may be defined between the first substrate 100 and the second substrate 200.

The cell gap GP may be maintained by a sealant SLM connecting the first substrate 100 and the second substrate 200. The sealant SLM may include an organic adhesive member or an inorganic adhesive member. The sealant SLM may include frit.

As illustrated in FIG. 1, the display panel DP may display an image via a display surface DP-IS. The display surface DP-IS may be parallel to a plane defined by a first direction DR1 and a second direction DR2. The display surface DP-IS may include a display area DA and a non-display area NDA adjacent to the display area DA. A pixel PX may be disposed in the display area DA. A pixel PX may not be disposed in the non-display area NDA. The non-display area NDA may be defined along edge of the display surface DP-IS. The non-display area NDA may surround the display area DA.

A third direction DR3 may indicate a normal direction of the display surface DP-IS, that is, a thickness direction of the display panel DP. A front surface (or a top surface) and a back surface (or a bottom surface) of each member or unit described below may be distinguished by the third direction DR3.

The directions indicated by the first to third directions DR1, DR2, and DR3 may be relative concepts, and may be changed to other directions. Hereinafter, the first to third directions may refer to the same reference numerals in the directions indicated by the first to third directions DR1, DR2, and DR3, respectively. Furthermore, in the specification, a surface defined by the first direction DR1 and the second direction DR2 may be defined as a plane, and the term "viewed in a plan view" may be defined as viewed in the third direction DR3.

The third direction DR3 may be a direction intersecting the first direction DR1 and the second direction DR2. The first direction DR1, the second direction DR2, and the third direction DR3 may be orthogonal to each other.

In an exemplary embodiment of the invention, a display panel DP having a planar display surface DP-IS is illustrated, but the invention is not limited thereto. In another exemplary embodiment, the display panel DP may include a curved display surface or a stereoscopic display surface. The stereoscopic display surface may include a plurality of display areas indicating different directions, respectively.

Figure 3:
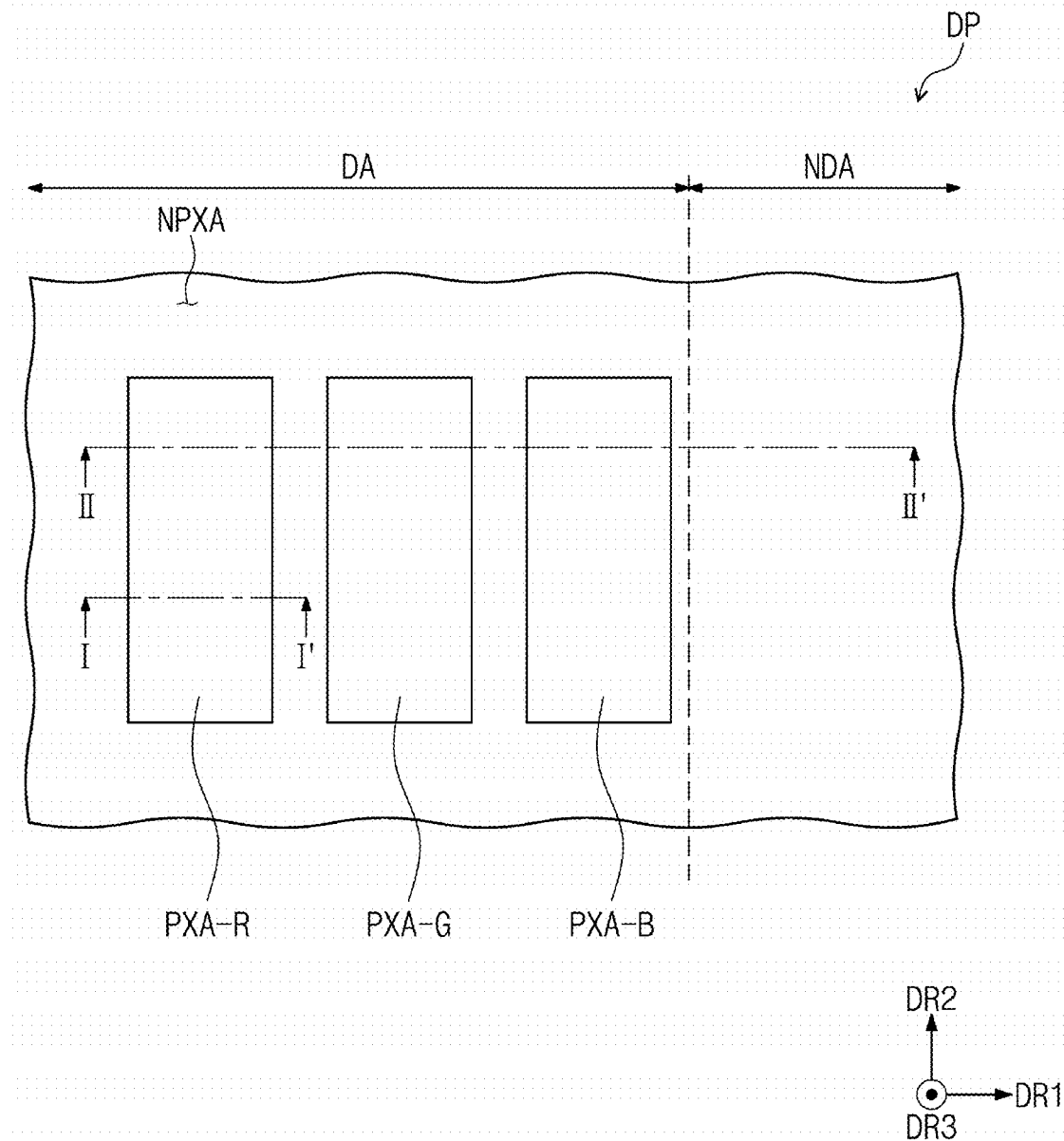
FIG. 3 is a plan view of an exemplary embodiment of a display panel according to the invention.

FIG. 3 is a plan view of an exemplary embodiment of a display panel according to the invention.

Referring to FIG. 3, the display panel DP may include first to third pixel areas PXA-R, PXA-G, and PXA-B in the display area DA. The first to third pixel areas PXA-R, PXA-G, and PXA-B illustrated in FIG. 3 may be repeatedly disposed throughout the display area DA.

A light blocking area NPXA may be disposed around the first to third pixel areas PXA-R, PXA-G, and PXA-B. The first to third pixel areas PXA-R, PXA-G, and PXA-B and the light blocking area NPXA may be substantially defined on a second substrate 200.

In the exemplary embodiment, although the first to third pixel areas PXA-R, PXA-G, and PXA-B which have the same area in the plan view are exemplarily illustrated, but the invention is not limited thereto. In other exemplary embodiments, the first to third pixel areas PXA-R, PXA-G, and PXA-B may have different areas, respectively, or at least two areas may be different from each other. Although, the rectangular first to third pixel areas PXA-R, PXA-G, and PXA-B in the plan view are illustrated, the invention is not limited thereto. In other exemplary embodiments, the first to third pixel areas PXA-R, PXA-G, and PXA-B in the plan view may have different polygonal shapes, and may have polygonal shapes having rounded corner regions.

One among the first to third pixel areas PXA-R, PXA-G, and PXA-B may provide a first color light for users, another one may provide a second color light different from the first color light, and the other one may provide a third color light different from the first color light and second color light.

In the exemplary embodiment, the first pixel area PXA-R may provide red light. The second pixel area PXA-G may provide green light. The third pixel area PXA-B may provide blue light. In the exemplary embodiment, source light may be blue light which is the third color light. The source light may be generated in a light source such as a backlight unit, or may be generated in a display device such as a light emitting diode.

The light blocking area NPXA may serve to prevent colors from mixing among the first to third pixel areas PXA-R, PXA-G, and PXA-B by setting boundaries. Furthermore, the light blocking area NPXA may block the source light such that the source light is not provided to the users.

Figure 4:
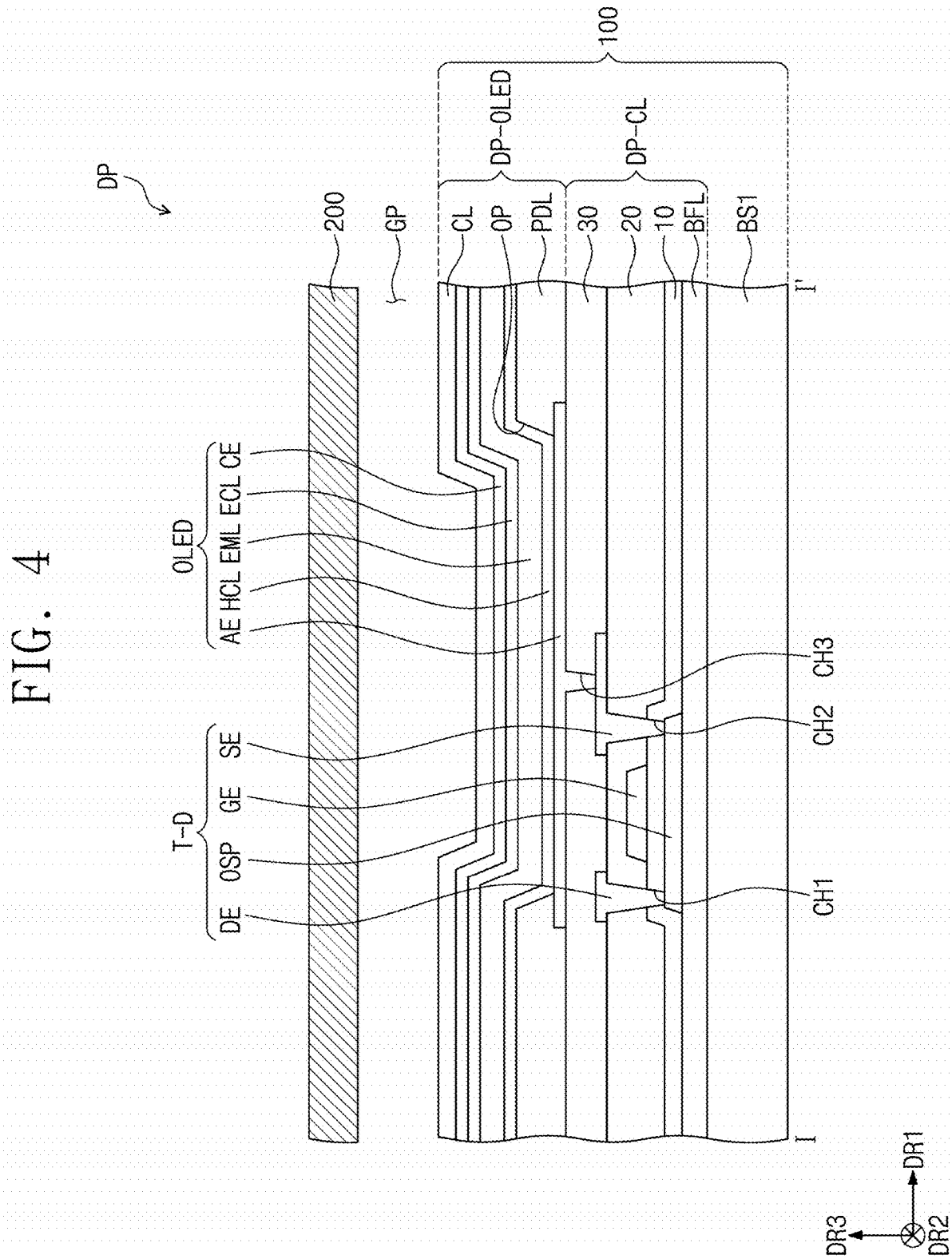
FIG. 4 is a cross-sectional view of an exemplary embodiment of a display panel taken along line I-I' illustrated in FIG. 3 according to the invention.

FIG. 4 is a cross-sectional view of an exemplary embodiment of a display panel taken along line I-I' illustrated in FIG. 3 according to the invention.

Referring to FIG. 4, FIG. 4 exemplarily illustrates a cross-section corresponding to a driving transistor T-D and an organic light emitting diode OLED. In FIG. 4, the second substrate 200 is illustrated briefly.

A first substrate 100 may include a first base layer BS1, a circuit device layer DP-CL disposed on the first base layer BS1, and a display device layer DP-OLED disposed on the circuit device layer DP-CL. In an exemplary embodiment, the circuit device layer DP-CL and the display device layer DP-OLED may be sequentially disposed on the first base layer BS1, for example.

The first base layer BS1 may include a synthetic resin substrate or a glass substrate. The circuit device layer DP-CL may include at least one insulating layer and circuit device. The circuit device may include a signal line, a driving circuit of a pixel, etc. The circuit device layer DP-CL may be provided through a step for forming an insulating layer, a semiconductor layer, and a conductive layer by coating, deposition, etc., and a step for patterning an insulating layer, a semiconductor layer, and a conductive layer by a photolithography process.

In the exemplary embodiment, the circuit device layer DP-CL may include a buffer layer BFL, which is an inorganic layer, a first intermediate inorganic layer 10, and a second intermediate inorganic layer 20, and may include an intermediate organic layer 30, which is an organic layer. Materials of the inorganic layer and the organic layer are not particularly limited, and the buffer layer BFL may be selectively disposed/omitted in an exemplary embodiment of the invention.

A semiconductor pattern OSP of the driving transistor T-D may be disposed on the buffer layer BFL. In an exemplary embodiment, the semiconductor pattern OSP may include amorphous silicon, polysilicon, or metal oxide semiconductors, for example.

The first intermediate inorganic layer 10 may be disposed on the semiconductor pattern OSP. A control electrode GE of the driving transistor T-D may be disposed on the first intermediate inorganic layer 10.

The second intermediate inorganic layer 20 covering the control electrode GE may be disposed on the first intermediate inorganic layer 10. Input electrode DE and output electrode SE of the driving transistor T-D may be disposed on the second intermediate inorganic layer 20.

The input electrode DE and the output electrode SE may be connected to the semiconductor pattern OSP via first through-hole CH1 and second through-hole CH2 passing through the first intermediate inorganic layer 10 and second intermediate inorganic layer 20, respectively. In another exemplary embodiment of the invention, the driving transistor T-D may be performed by being modified into a bottom gate structure.

The intermediate organic layer 30 covering the input electrode DE and output electrode SE may be disposed on the second intermediate inorganic layer 20. The intermediate organic layer 30 may provide a flat surface.

The display device layer DP-OLED may be disposed on the intermediate organic layer 30. The display device layer DP-OLED may include a pixel defining layer PDL and an organic light emitting diode OLED. A first electrode AE may be disposed on the intermediate organic layer 30. The first electrode AE may be connected to the output electrode SE via a third through-hole CH3 passing through the intermediate organic layer 30. An opening OP may be defined in the pixel defining layer PDL. The opening OP of the pixel defining layer PDL may expose at least a portion of the first electrode AE. However, the invention is not limited thereto, and in another exemplary embodiment of the invention, the pixel defining layer PDL may be omitted.

In an exemplary embodiment of the invention, the first to third pixel areas PXA-R, PXA-G, and PXA-B (refer to FIG. 3) may be defined corresponding to a portion of the first electrode AE exposed by the opening OP.

In an exemplary embodiment of the invention, the first to third pixel areas PXA-R, PXA-G, and PXA-B (refer to FIG. 3) may overlap the driving transistor T-D. The opening OP may become wider, and the first electrode AE and an emission layer EML, which will be described later, may also be wider.

A hole control layer HCL may be disposed in the first to third pixel areas PXA-R, PXA-G, PXA-B (refer to FIG. 3), and the light blocking area NPXA (refer to FIG. 3) in common. An emission layer EML may be disposed on the hole control layer HCL. The emission layer EML may be disposed in an area corresponding to the opening OP. The emission layer EML may include an organic material and/or an inorganic material. The emission layer EML may generate a predetermined color-light.

An electron control layer ECL may be disposed on the emission layer EML. A second electrode CE may be disposed on the electron control layer ECL. The second electrode CE may have a larger area than the first electrode AE. A cover layer CL for protecting the second electrode CE may be further disposed on the second electrode CE. The cover layer CL may include an organic material or an inorganic material. However, the invention is not limited thereto, and in another exemplary embodiment, the cover layer CL may be omitted.

In an exemplary embodiment of the invention, the organic light emitting diode OLED may further include a resonance structure for controlling a resonance distance of light to be generated in the emission layer EML. The resonance structure may be disposed between the first electrode AE and the second electrode CE, and a thickness of the resonance structure may be determined depending on a wavelength of light to be generated in the emission layer EML.

Figure 5:
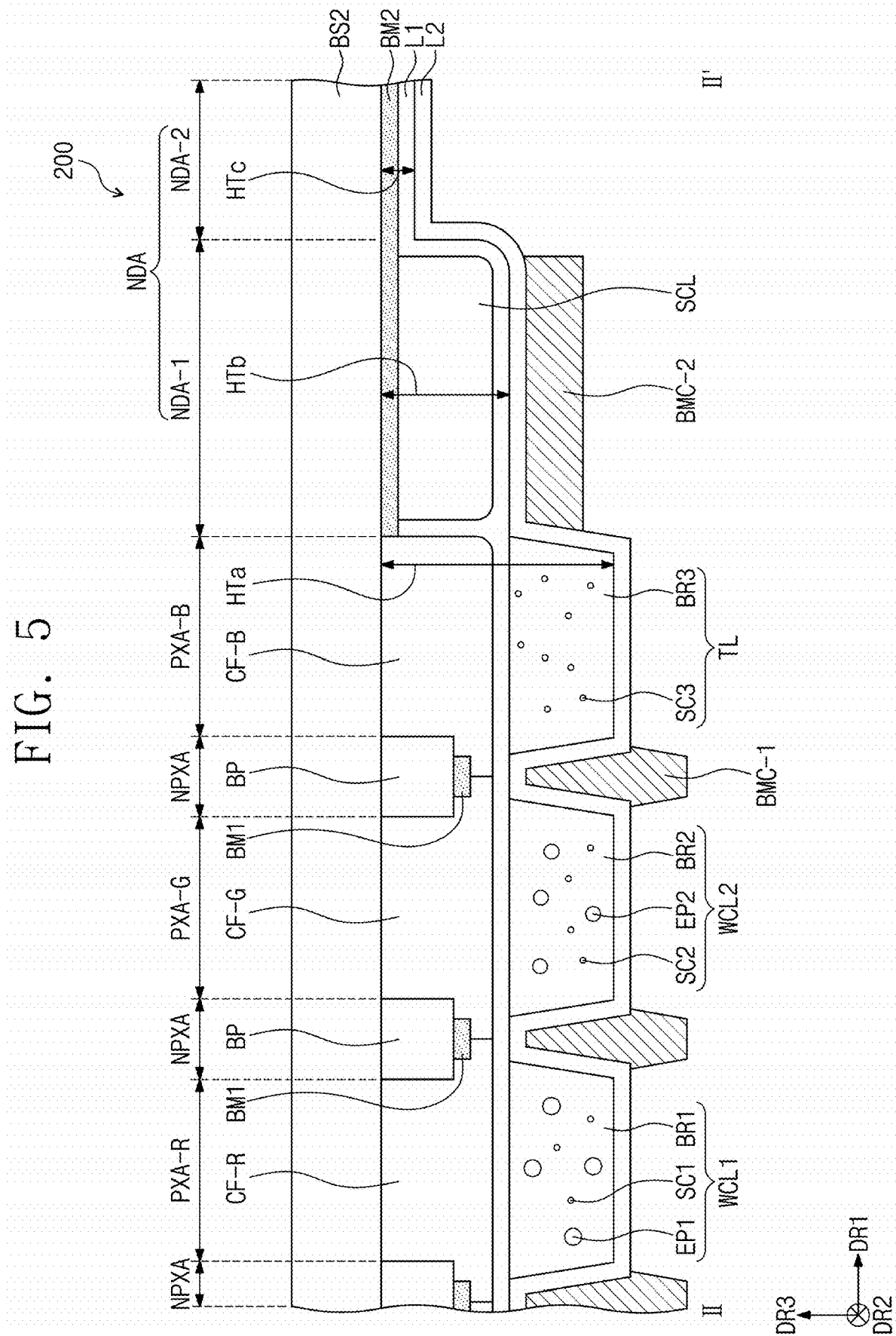
FIG. 5 is an enlarged cross-sectional view of an exemplary embodiment of a portion of a display panel taken along line illustrated in FIG. 3 according to the invention.

FIG. 5 is an enlarged cross-sectional view of an exemplary embodiment of a portion of a display panel taken along line II-IP illustrated in FIG. 3 according to the invention.

Referring to FIGS. 3 and 5, the second substrate 200 may include a second base layer BS2, color filter layers CF-R, CF-G, and CF-B, a light blocking portion BP, a first light blocking portion BM1, a second light blocking portion BM2, a first sealing layer L1, color control layers WCL1, WCL2, and TL, a step compensating layer SCL, a second sealing layer L2, a first light blocking layer BMC-1, and a second light blocking layer BMC-2.

A display area DA, a first non-display area NDA-1 adjacent to the display area DA, and a second non-display area NDA-2 adjacent to the first non-display area NDA-1 may be defined on the second substrate 200.

The second base layer BS2, the color filter layers CF-R, CF-G, and CF-B, the light blocking portion BP, the first light blocking portion BM1, the first sealing layer L1, the color control layers WCL1, WCL2, and TL, the second sealing layer L2, and the first light blocking layer BMC-1 may be disposed on the display area DA.

The second base layer BS2 may include a synthetic resin substrate or a glass substrate.

The color filter layers CF-R, CF-G, and CF-B may be disposed under the second base layer BS2. The color filter layers CF-R, CF-G, and CF-B may include a first color filter layer CF-R, a second color filter layer CF-G, and a third color filter layer CF-B.

The first color filter layer CF-R may overlap the first pixel area PXA-R in a plan view. The second color filter layer CF-G may overlap the second pixel area PXA-G in a plan view. The third color filter layer CF-B may overlap the third pixel area PXA-B in a plan view.

The first color filter layer CF-R, the second color filter layer CF-G, and the third color filter layer CF-B may transmit different wavelengths, respectively.

In an exemplary embodiment, the first color filter layer CF-R may transmit light in a wavelength range of red light and absorb other light, for example. The second color filter layer CF-G may transmit light in a wavelength range of green light and absorb other light. The third color filter layer CF-B may transmit light in a wavelength range of blue light and absorb other light.

In the exemplary embodiment, the first color filter layer CF-R may be a red color filter layer, the second color filter layer CF-G may be a green color filter layer, and the third color filter layer CF-B may be a blue color filter layer.

The first color filter layer CF-R, the second color filter layer CF-G, and the third color filter layer CF-B may include a base resin and dye and/or pigment dispersed in the base resin. The first color filter layer CF-R, the second color filter layer CF-G, and the third color filter layer CF-B may include different kinds of dyes/pigments, respectively.

The light blocking portion BP may be disposed between the first to third color filter layers CF-R, CF-G, and CF-B. The light blocking portion BP may overlap the light blocking area NPXA in a plan view. The light blocking portion BP may block light. The light blocking portion BP may include the same material as that of the third color filter layer CF-B. In another exemplary embodiment of the invention, the third color filter layer CF-B may be omitted, and the light blocking portion BP may extend to the third pixel area PXA-B. In an alternative exemplary embodiment, the light blocking portion BP may be omitted.

The first light blocking portion BM1 may be disposed under the light blocking portion BP. The first light blocking portion BM1 may overlap the light blocking area NPXA in a plan view. The first light blocking portion BM1 has typically an opaque black color, but the invention is not limited thereto and may have various colors. In an exemplary embodiment of the invention, the first light blocking portion BM1 may include carbon black particles. Some of the light incident on the first light blocking portion BM1 may be reflected to the carbon black particles. However, the exemplary embodiment is exemplarily, and the first light blocking portion BM1 in an exemplary embodiment of the invention may include various materials.

The first sealing layer L1 may be disposed under the color filter layers CF-R, CF-G, and CF-B. The first sealing layer L1 may cover the color filter layers CF-R, CF-G, and CF-B. In an exemplary embodiment, the first sealing layer L1 may include any one of silicon oxide, silicon nitride, or silicon oxynitride, for example. However, the exemplary embodiment is exemplarily, and the first sealing layer L1 may include various materials.

The color control layers WCL1, WCL2, and TL may be disposed under the first sealing layer L1. The color control layers WCL1, WCL2, and TL may include a first wavelength conversion layer WCL1, a second wavelength conversion layer WCL2, and a transmission layer TL.

The first wavelength conversion layer WCL1 may overlap the first pixel area PXA-R. The second wavelength conversion layer WCL2 may overlap the second pixel area PXA-G. The transmission layer TL may overlap the third pixel area PXA-B.

The first wavelength conversion layer WCL1 may be disposed under the first color filter layer CF-R. The second wavelength conversion layer WCL2 may be disposed under the second color filter layer CF-G. The transmission layer TL may be disposed under the third color filter layer CF-B.

The first wavelength conversion layer WCL1 may include a first base resin BR1, first scattering particle SC1, and a first emitting material EP1. The second wavelength conversion layer WCL2 may include a second base resin BR2, second scattering particles SC2, and a second emitting material EP2. The transmission layer TL may include a third base resin BR3 and third scattering particles SC3.

The first to third base resins BR1, BR2, and BR3 may be a medium in which emitting materials are dispersed, and may include various resin compositions referred to typically as binders. However, the invention is not limited thereto, and as long as a medium capable of dispersing the emitting materials herein, it may be referred to as a base resin regardless of its name, additional other functions, constituent materials, etc. The base resin may be a polymer resin. In an exemplary embodiment, the base resin may be, for example, an acrylic-based resin, a urethane-based resin, a silicone-based resin, an epoxy-based resin, etc. The base resin may be a transparent resin.

Each of the first emitting material EP1 and the second emitting material EP2 may be particles for converting a wavelength of light. Each of the first emitting material EP1 and the second emitting material EP2 may be, for example, a quantum dot. The first emitting material EP1 may absorb blue light to generate red light. The second emitting material EP2 may absorb blue light to generate green light.

The quantum dots, which have a crystal structure of a few nanometers in size and include hundreds to thousands of atoms, exhibit a quantum confinement effect in which an energy band gap is increased due to the small size thereof. When the quantum dots are irradiated with light having a wavelength higher than the band gap, the quantum dots are excited by absorbing the light, and emit light having a specific wavelength to fall to a ground state. The light of the emitted wavelength has a value corresponding to the band gap. Luminescence characteristics caused by the quantum confinement effect of the quantum dots may be adjusted by adjusting the size and composition thereof.

The quantum dots may be a core-shell structure including a core and a shell surrounding the core. In an exemplary embodiment, the core of the quantum dot may include one of a Group II-VI compound, a Group III-V compound, a Group IV-VI compound, a Group IV element, a Group IV compound, and a combination thereof.

In an exemplary embodiment, the Group II-VI compound may include a binary element compound including one of CdSe, CdTe, ZnS, ZnSe, ZnTe, ZnO, HgS, HgSe, HgTe, MgSe, MgS, and a combination thereof, a ternary element compound including one of AgInS, CuInS, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof, and a quaternary element compound including one of HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

In an exemplary embodiment, the Group III-V compound may include a binary element compound including one of GaN, GaP, GaAs, GaSb, AlN, AlP, AlAs, AlSb, InN, InP, InAs, InSb, and a combination thereof, a ternary element compound including one of GaNP, GaNAs, GaNSb, GaPAs, GaPSb, AlNP, AlNAs, AlNSb, AlPAs, AlPSb, InGaP, InNP, InNAs, InNSb, InPAs, InPSb, GaAlNP, and a combination thereof, and a quaternary element compound including one of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof.

In an exemplary embodiment, the Group IV-VI compound may include a binary element compound including one of SnS, SnSe, SnTe, PbS, PbSe, PbTe, and a combination thereof, a ternary element compound including one of SnSeS, SnSeTe, SnSTe, PbSeS, PbSeTe, PbSTe, SnPbS, SnPbSe, SnPbTe, and a combination thereof, and a quaternary element compound including one of SnPbSSe, SnPbSeTe, SnPbSTe, and a combination thereof. In an exemplary embodiment, the Group IV element may include Si, Ge, and a combination thereof. In an exemplary embodiment, the Group IV compound may be a binary element compound including one of SiC, SiGe, and a combination thereof.

At this time, the binary element compound, the ternary element compound, or the quaternary element compound may be in a particle at a uniform concentration, or may be in a particle in which a concentration distribution is partially divided into different states.

The quantum dots may also have a core-shell structure in which one quantum dot surrounds the other quantum dot. The shell of the quantum dot may serve as a protective layer for maintaining semiconductor characteristics by preventing chemical denaturation of the core and/or as a charging layer for giving electrophoresis characteristics to the quantum dot. The shell may be a single layer or multiple layers. An interface between the core and the shell may have a concentration gradient in which a concentration of the elements in the shell becomes lowered toward the core. In an exemplary embodiment, the shell of the quantum dot may include, for example, a metal or nonmetal oxide, a semiconductor compound, or a combination thereof.

In an exemplary embodiment, the metal or nonmetal oxide may include, for example, a binary element compound such as $SiO_2$, $Al_2O_3$, $TiO_2$, $ZnO$, $MnO$, $Mn_2O_3$, $Mn_3O_4$, $CuO$, $FeO$, $Fe_2O_3$, $Fe_3O_4$, $CoO$, $Co_3O_4$, and $NiO$, or a ternary element compound such as $MgAl_2O_4$, $CoFe_2O_4$, $NiFe_2O_4$, and $CoMn_2O_4$, but the invention is not limited thereto.

In addition, the semiconductor compound may include, for example, CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, etc., but the invention is not limited thereto.

In an exemplary embodiment, the quantum dot may have a full width of half maximum ("FWHM") of an emission wavelength spectrum of about 45 nanometers (nm) or less, preferably about 40 nm or less, more preferably about 30 nm or less, and color purity or color reproducibility may be improved in the described range. In addition, light emitted via the quantum dot may be emitted in all directions, thereby improving a viewing angle of light.

Furthermore, a shape of the quantum dot is not limited to a specific shape typically used in the art, but more specifically, spherical, pyramidal, multi-arm, or cubic nanoparticles, nanotubes, nanowires, nanofibers, nanoplate particles, etc. may be used.

The quantum dot may adjust color of emitted light depending on the particle size thereof, and accordingly, the quantum dot may have various emission colors such as blue, red, and green.

In an exemplary embodiment of the invention, the quantum dot may change color of emitted light depending on the particle size thereof. A particle size of the first emitting material EP1 and a particle size of the second emitting material EP2 may be different from each other. The particle size of the first emitting material EP1 may be, for example, larger than that of the second emitting material EP2. In this case, the first emitting material EP1 may emit light having a longer wavelength than that of the second emitting material EP2.

The first wavelength conversion layer WCL1 may be provided as a first color filter layer CF-R by converting blue light into red light. The second wavelength conversion layer WCL2 may be provided as a second color filter layer CF-G by converting blue light into green light. The transmission layer TL may be provided as a third color filter layer CF-B by scattering blue light.

In an exemplary embodiment, the first to third scattering particles SC1, SC2, and SC3 may be $TiO_2$ or silica-based nanoparticles, for example. The first to third scattering particles SC1, SC2, and SC3 may scatter light. An amount of the third scattering particles SC3 included in the transmission layer TL may be larger than each amount of the first scattering particles SC1 included in the first wavelength conversion layer WCL1 and the second scattering particles SC2 included in the second wavelength conversion layer WCL2 because the transmission layer TL does not include an emitting material. In another exemplary embodiment of the invention, the first and second scattering particles SC1 and SC2 may be omitted.

The second sealing layer L2 may be disposed under the color control layers WCL1, WCL2, and TL. The second sealing layer L2 may cover the color control layers WCL1, WCL2, and TL. The second sealing layer L2 may be substantially the same material as that of the first sealing layer L1. However, the exemplary embodiment is exemplary, and the second sealing layer L2 in an exemplary embodiment of the invention may include various materials.

The first light blocking layer BMC-1 may be disposed under the second sealing layer L2. The first light blocking layer BMC-1 may be disposed between the color control layers WCL1, WCL2, and TL. The first light blocking layer BMC-1 may prevent source light from being provided on side surfaces of the color control layers WCL1, WCL2, and TL. Blue light, which proceeds in a direction causing mixing of colors among the light provided to the color control layers WCL1, WCL2, and TL, may be absorbed by the first light blocking layer BMC-1. Accordingly, the mixing of colors between the first to third pixel areas PXA-R, PXA-G, and PXA B may be reduced, and display quality of the display panel DP may be improved.

A second base layer BS2, a second light blocking portion BM2, a step compensating layer SCL, a first sealing layer L1, a second sealing layer L2, and a second light blocking layer BMC-2 may be disposed on the first non-display area NDA-1.

The second light blocking portion BM2 may be disposed under the second base layer BS2. The second light blocking portion BM2 may overlap the non-display area NDA in a plan view. The second light blocking portion BM2 may block passage of light incident in the non-display area NDA. In an exemplary embodiment, the second light blocking portion BM2 may absorb or reflect light incident in the non-display area NDA, for example. The second light blocking portion BM2 may include substantially the same material as that of the first light blocking portion BM1.

The step compensating layer SCL may be disposed under the second light blocking portion BM2. The step compensating layer SCL may be disposed between the first sealing layer L1 and the second base layer BS2. The step compensating layer SCL may include the same material as any one of materials of the first to third color filter layers CF-R, CF-G, and CF-B. The step compensating layer SCL may be provided simultaneously in the same step as that in which any one among the first to third color filter layers CF-R, CF-G, and CF-B is manufactured.

The first sealing layer L1 and the second sealing layer L2 may be disposed under the step compensating layer SCL. The first sealing layer L1 and the second sealing layer L2 may cover the step compensating layer SCL.

The second light blocking layer BMC-2 may be disposed under the second sealing layer L2. The second light blocking layer BMC-2 may block source light incident at the end of the display area DA. The second light blocking layer BMC-2 may prevent a light leakage phenomenon. The second light blocking layer BMC-2 may include substantially the same material as that of the first light blocking layer BMC-1.

The second base layer BS2, the second light blocking portion BM2, the first sealing layer L1, and the second sealing layer L2 may be disposed in the second non-display area NDA-2.

In the display area DA, a first maximum distance HTa in the third direction DR3 from the second base layer BS2 to the second sealing layer L2 may be longer than a second maximum distance HTb in the third direction DR3 from the second base layer BS2 to the second sealing layer L2. In the second non-display area NDA-2, the second maximum distance HTb may be longer than a third maximum distance HTc in the third direction DR3 from the second base layer BS2 to the second sealing layer L2.

According to the invention, the step compensating layer SCL may reduce a step by a difference between the second maximum distance HTb and the third maximum distance HTc at a boundary between the display area DA and the first non-display area NDA-1. The step compensating layer SCL may relieve a stress applied by the step difference at a boundary between the display area DA and the first non-display area NDA-1. The step compensating layer SCL may reduce a lifting phenomenon of the second sealing layer L2 at a boundary between the display area DA and the first non-display area NDA-1. Accordingly, a display panel DP with improved reliability may be provided. Unlike the illustrated exemplary embodiment of the invention, when the step compensating layer SCL is absent, the step difference between the display area DA and the first non-display area NDA-1 may be increased. In this case, choice of the materials constituting the second sealing layer L2 may be limited in consideration of the step difference. However, in an exemplary embodiment of the invention, the step compensating layer SCL may be disposed in the non-display area NDA to relieve the step difference. Accordingly, choice of the materials constituting the second sealing layer L2 may be widened. The second sealing layer L2 may be selected to include a material capable of improving light efficiency and luminance.

Figure 6:
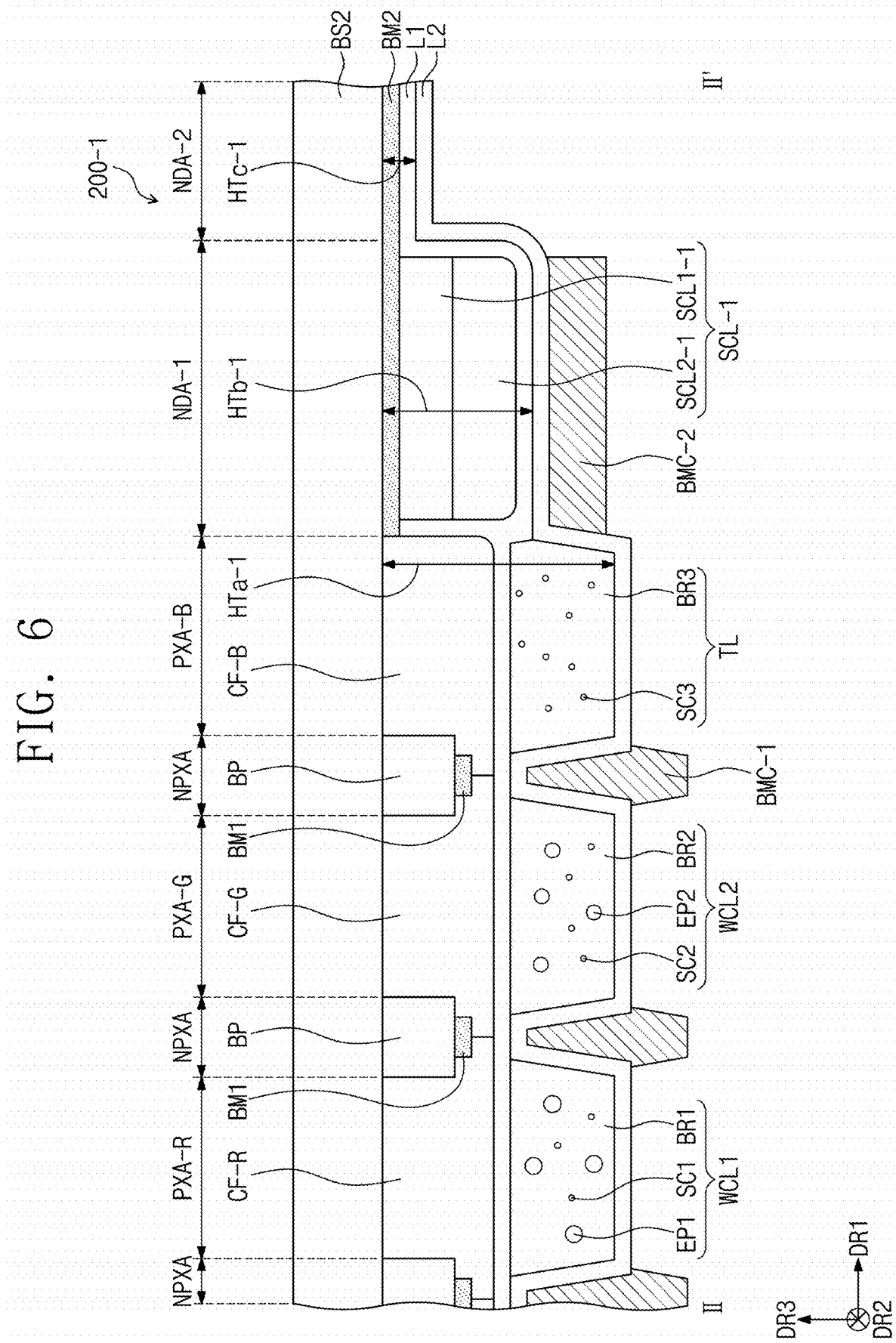
FIG. 6 is an enlarged cross-sectional view of an exemplary embodiment of a portion of a display panel taken along line corresponding to IMF illustrated in FIG. 3 according to the invention.

FIG. 6 is an enlarged cross-sectional view of an exemplary embodiment of a portion of a display panel taken along line corresponding to II-IF illustrated in FIG. 3 according to the invention. The same reference numerals are given to the constituent elements described in FIG. 5, and the description thereof will be omitted.

Referring to FIGS. 3 and 6, in a second substrate 200-1, a step compensating layer SCL-1 may include a first layer SCL1-1 and a second layer SCL2-1 disposed under the first layer SCL1-1.

The first layer SCL1-1 may include the same material as any one of materials of first to third color filter layers CF-R, CF-G, and CF-B. The second layer SCL2-1 may include the same material as another one among first to third color filter layers CF-R, CF-G, and CF-B.

The first layer SCL1-1 and the second layer SCL2-1 may be provided simultaneously in the same step as that in which any one among the first to third color filter layers CF-R, CF-G, and CF-B is manufactured.

A first maximum distance HTa-1 in the third direction DR3 from the second base layer BS2 to the second sealing layer L2 in the display area DA may be longer than a second maximum distance HTb-1 in the third direction DR3 from the second base layer BS2 to the second sealing layer L2 in the first non-display area NDA-1. The second maximum distance HTb-1 may be longer than a third maximum distance HTc-1 in the third direction DR3 from the second base layer BS2 to the second sealing layer L2 in the second non-display area NDA-2.

According to the invention, the step compensating layer SCL-1 may reduce a step by a difference between the second maximum distance HTb-1 and the third maximum distance HTc-1 at a boundary between the display area DA and the first non-display area NDA-1. The step compensating layer SCL-1 may relieve a stress caused by the step difference at a boundary between the display area DA and the first non-display area NDA-1. The step compensating layer SCL-1 may reduce a lifting phenomenon of the second sealing layer L2 at a boundary between the display area DA and first non-display area NDA-1 of the second sealing layer L2. Accordingly, a display panel DP with improved reliability may be provided. The step compensating layer SCL-1 may be disposed in the first non-display area NDA-1 to relieve the step difference, and accordingly, choice of the materials constituting the second sealing layer L2 may be widened. Accordingly, the second sealing layer L2 may be selected to include a material capable of improving light efficiency and luminance.

Figure 7:
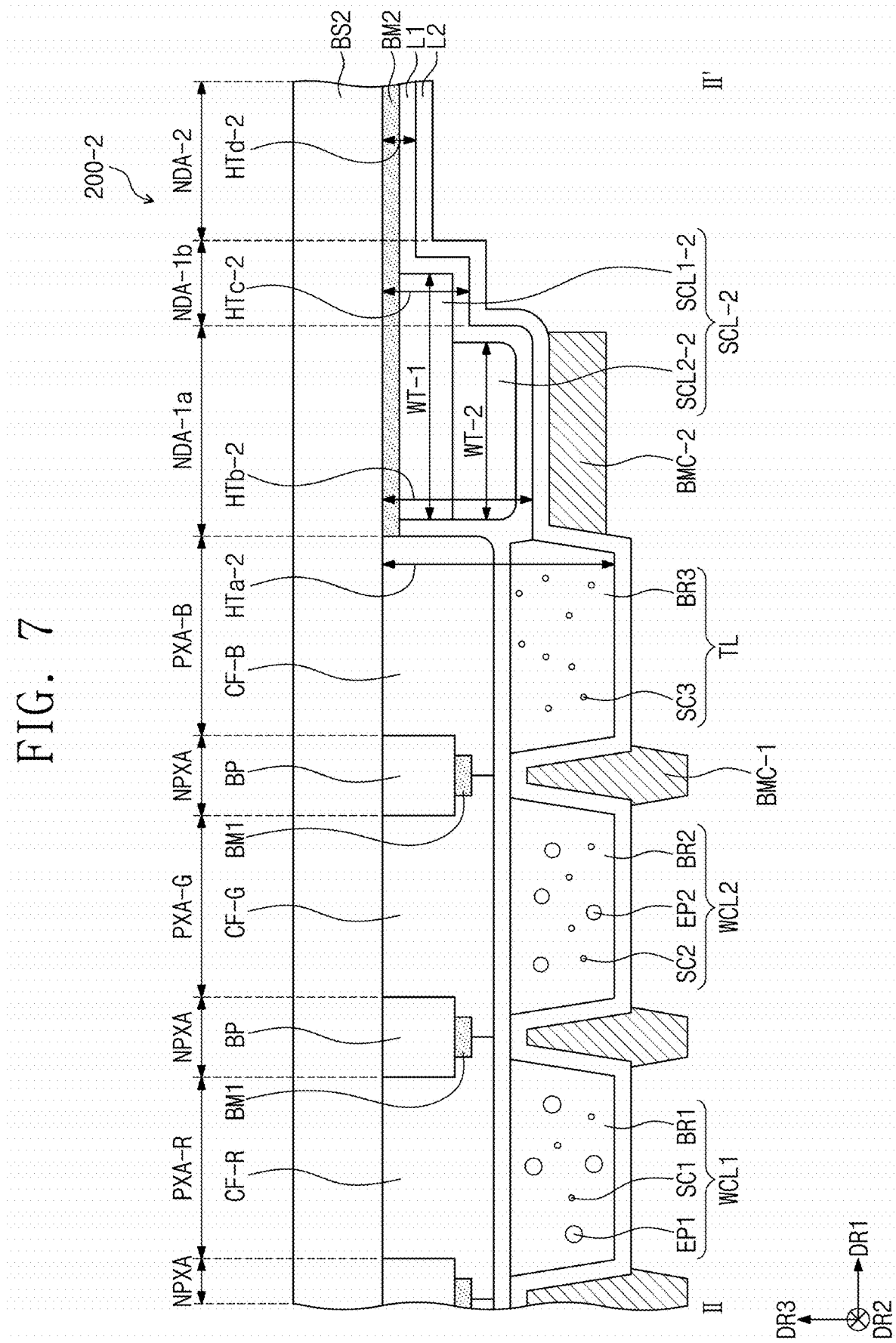
FIG. 7 is an enlarged cross-sectional view of an exemplary embodiment of a portion of a display panel taken along line corresponding to IMF illustrated in FIG. 3 according to the invention.

FIG. 7 is an enlarged cross-sectional view of an exemplary embodiment of a portion of a display panel taken along line corresponding to IMF illustrated in FIG. 3 according to the invention. The same reference numerals are given to the constituent elements described in FIG. 5, and the description thereof will be omitted.

Referring to FIGS. 3 and 7, the display area DA and the non-display area NDA may be defined on a second substrate 200-2. The non-display area NDA may include a first step non-display area NDA-1a adjacent to the display area DA, a second step non-display area NDA-1b adjacent to the first step non-display area NDA-1a, and a second non-display area NDA-2 adjacent to the second step non-display area NDA-1b.

A step compensating layer SCL-2 may include a first layer SCL1-2 and a second layer SCL2-2 disposed under the first layer SCL1-2.

The first layer SCL1-2 may overlap the first step non-display area NDA-la and the second step non-display area NDA-1b in a plan view. The second layer SCL2-2 may overlap the first step non-display area NDA-1a in a plan view.

The first layer SCL1-2 may include the same material as any one of materials of the first to third color filter layers CF-R, CF-G, and CF-B. The second layer SCL2-2 may include the same material as another one among the first to third color filter layers CF-R, CF-G, and CF-B.

The first layer SCL1-2 and the second layer SCL2-2 may be provided simultaneously in the same step as that in which any one among the first to third color filter layers CF-R, CF-G, and CF-B is manufactured.

The first layer SCL1-2 may have a first width WT-1 in the first direction DR1. The second layer SCL2-2 may have a second width WT-2 in the first direction DR1.

The first width WT-1 may be wider than the second width WT-2.

A first maximum distance HTa-2 in the third direction DR3 from the second base layer BS2 to the second sealing layer L2 in the display area DA may be longer than a second maximum distance HTb-2 in the third direction DR3 from the second base layer BS2 to the second sealing layer L2 in the first step non-display area NDA-lb. The second maximum distance HTb-2 may be longer than a third maximum distance HTc-2 in the third direction DR3 from the second base layer BS2 to the second sealing layer L2 in the second step non-display area NDA-1b. The third maximum distance HTc-2 may be longer than a fourth maximum distance HTd-2 in the third direction DR3 from the second base layer BS2 to the second sealing layer L2 in the second non-display area NDA-2.

According to the invention, the step compensating layer SCL-2 may provide steps in the first step non-display area NDA-1a and the second step non-display area NDA-1b, respectively, to relieve a height difference caused at a boundary between the display area DA and the non-display area NDA. The step compensating layer SCL-2 may reduce a lifting phenomenon of the second sealing layer L2 at a boundary between the display area DA and non-display area NDA of the second sealing layer L2. Accordingly, a display panel DP with improved reliability may be provided. In addition, the step is relieved to widen choice of the materials constituting the second sealing layer L2, and accordingly, the second sealing layer L2 may be selected to include a material capable of improving light efficiency and luminance.

Figure 8:
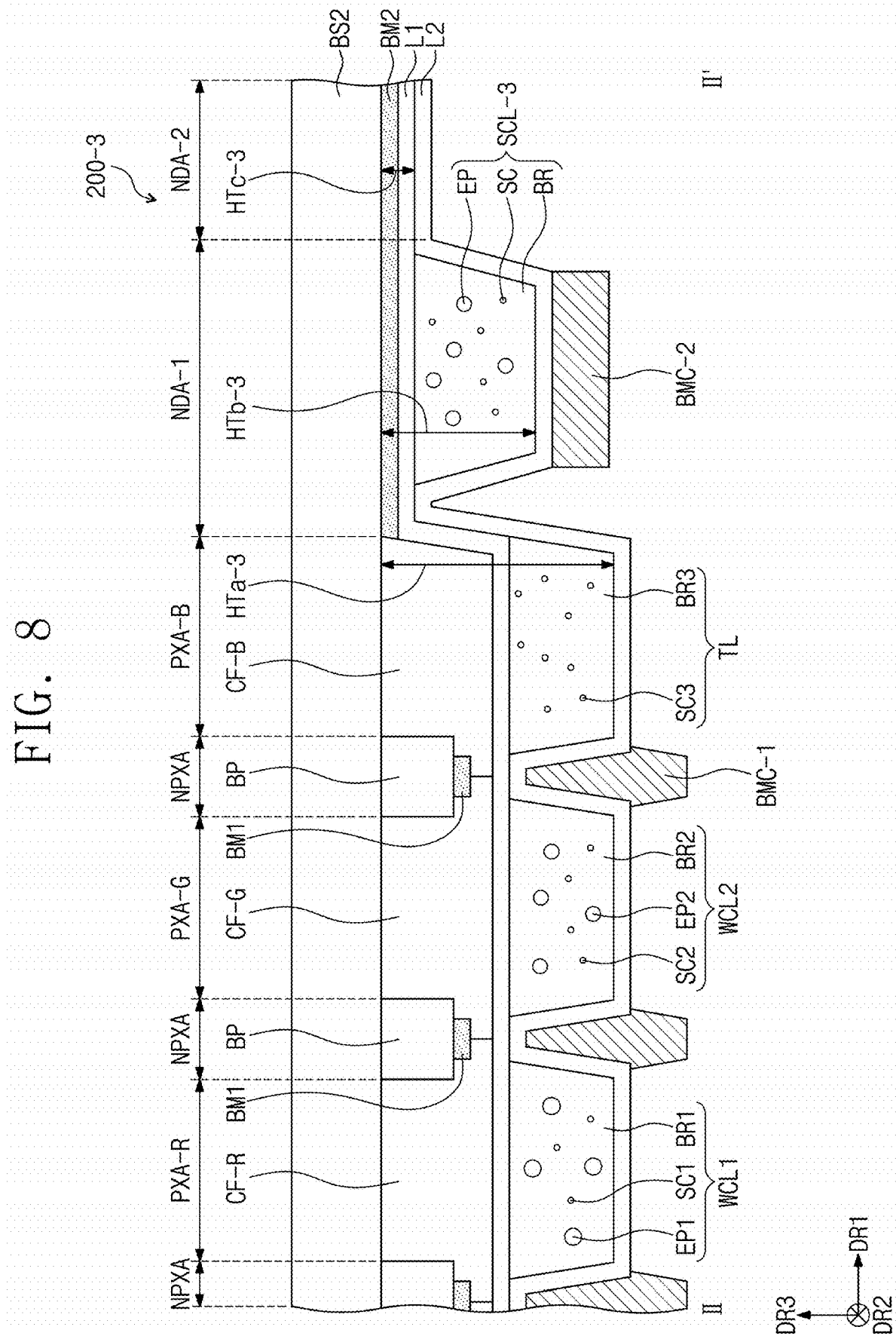
FIG. 8 is an enlarged cross-sectional view of an exemplary embodiment of a portion of a display panel taken along line corresponding to II-II' illustrated in FIG. 3 according to the invention.

FIG. 8 is an enlarged cross-sectional view of an exemplary embodiment of a portion of a display panel taken along line corresponding to IMF illustrated in FIG. 3 according to the invention. The same reference numerals are given to the constituent elements described in FIG. 5, and the description thereof will be omitted.

Referring to FIGS. 3 and 8, a step compensating layer SCL-3 may be disposed between the first sealing layer L1 and the second sealing layer L2.

The step compensating layer SCL-3 may include a base resin BR, scattering particles SC, and an emitting material EP. The step compensating layer SCL-3 may include the same material as any one of materials of the first wavelength conversion layer WCL1 and the second wavelength conversion layer WCL2. However, the exemplary embodiment is exemplarily, and the step compensating layer SCL-3 in an exemplary embodiment of the invention may include the same material as that of the transmission layer TL.

The step compensating layer SCL-3 may be spaced apart from the transmission layer TL in the first direction DR1. Accordingly, light incident on the step compensating layer SCL-3 may not be provided to the transmission layer TL.

A first maximum distance HTa-3 in the third direction DR3 from the second base layer BS2 to the second sealing layer L2 in the display area DA may be longer than a second maximum distance HTb-3 in the third direction DR3 from the second base layer BS2 to the second sealing layer L2 in the first non-display area NDA-1. The second maximum distance HTb-3 may be longer than a third maximum distance HTc-3 in the third direction DR3 from the second base layer BS2 to the second sealing layer L2 in the second non-display area NDA-2.

According to the invention, the step compensating layer SCL-3 may reduce a step by a difference between the second maximum distance HTb-3 and the third maximum distance HTc-3 at a boundary between the display area DA and the first non-display area NDA-1. The step compensating layer SCL-3 may relieve a stress caused by the step difference at a boundary between the display area DA and first non-display area NDA-1 of the second sealing layer L2. The step compensating layer SCL-3 may reduce a lifting phenomenon of the second sealing layer L2 at a boundary between the display area DA and first non-display area NDA-1 of the second sealing layer L2. Accordingly, a display panel DP with improved reliability may be provided. In addition, the step is relieved to widen choice of the materials constituting the second sealing layer L2. The second sealing layer L2 may be selected to include a material capable of improving light efficiency and luminance.

Figure 9:
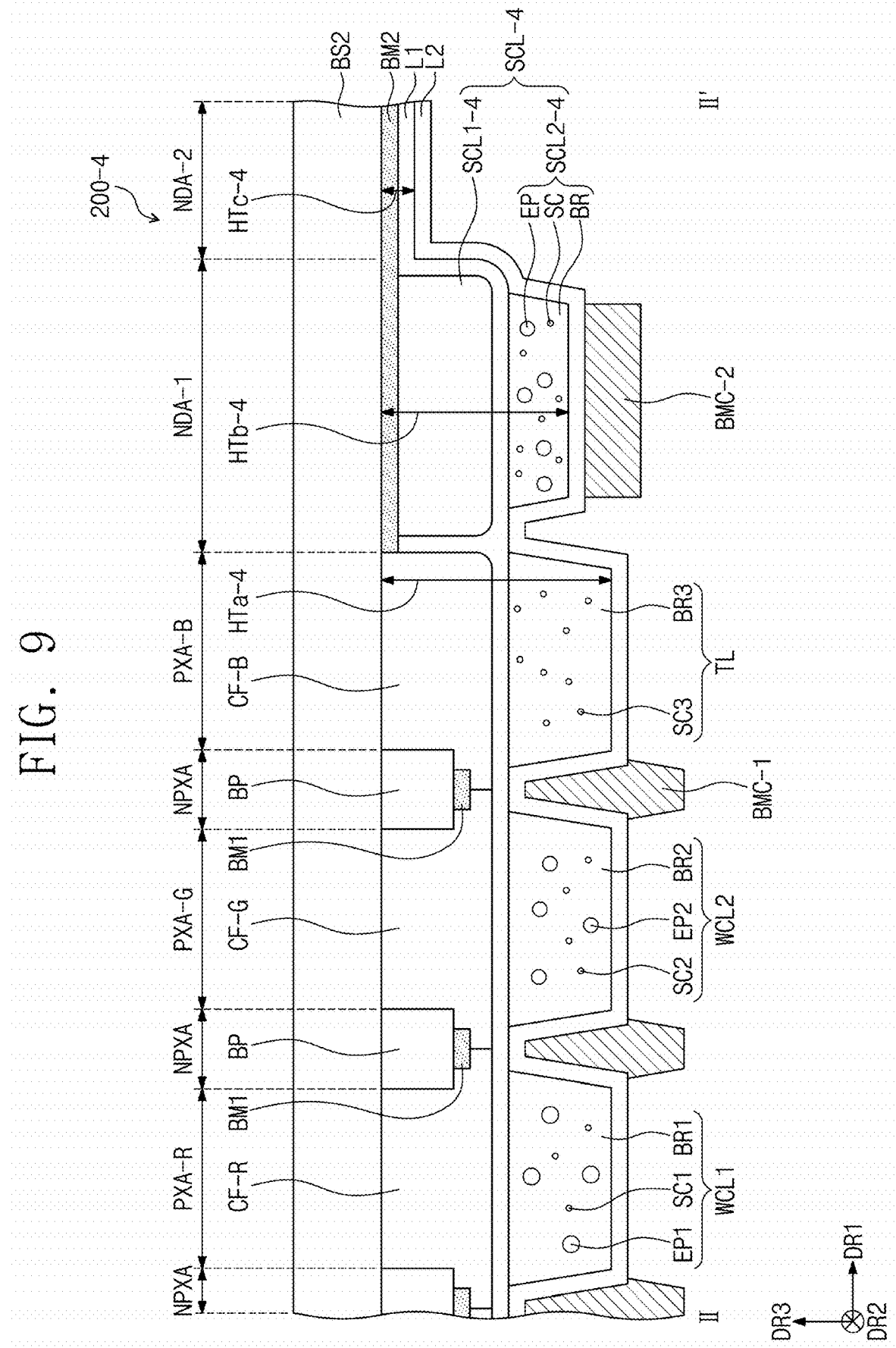
FIG. 9 is an enlarged cross-sectional view of an exemplary embodiment of a portion of a display panel taken along line corresponding to II-II' illustrated in FIG. 3 according to the invention.

FIG. 9 is an enlarged cross-sectional view of an exemplary embodiment of a portion of a display panel taken along line corresponding to II-IF illustrated in FIG. 3 according to the invention. The same reference numerals are given to the constituent elements described in FIG. 5, and the description thereof will be omitted.

Referring to FIGS. 3 and 9, in a second substrate 200-4, a step compensating layer SCL-4 may include a first layer SCL1-4 and a second layer SCL2-4 disposed on the first layer SCL1-4.

The first layer SCL1-4 may be disposed under the second base layer BS2. The first sealing layer L1 may be disposed between the first layer SCL1-4 and the second layer SCL2-4. The second layer SCL2-4 may be disposed between the first sealing layer L1 and the second sealing layer L2.

The first layer SCL1-4 may include the same material as any one of materials of the first to third color filter layers CF-R, CF-G, and CF-B. The second layer SCL2-4 may include a base resin BR, scattering particles SC, and an emitting material EP. The second layer SCL2-4 may include the same material as any one of materials of the first wavelength conversion layer WCL1 and the second wavelength conversion layer WCL2. However, the exemplary embodiment is exemplarily, and the second layer SCL2-4 in an exemplary embodiment of the invention may include the same material as that of the transmission layer TL.

The second layer SCL2-4 may be spaced apart from the transmission layer TL in the first direction DR1. Accordingly, light incident on the second layer SCL2-4 may not be provided to the transmission layer TL. A first maximum distance HTa-4 in the third direction DR3 from the second base layer BS2 to the second sealing layer L2 in the display area DA may be longer than a second maximum distance HTb-4 in the third direction DR3 from the second base layer BS2 to the second sealing layer L2 in the first non-display area NDA-1. The second maximum distance HTb-4 may be longer than a third maximum distance HTc-4 in the third direction DR3 from the second base layer BS2 to the second sealing layer L2 in the second non-display area NDA-2.

According to the invention, the step compensating layer SCL-4 may reduce a step by a difference between the second maximum distance HTb-4 and the third maximum distance HTc-4 at a boundary between the display area DA and the first non-display area NDA-1. The step compensating layer SCL-4 may relieve a stress caused by the step difference at a boundary between the display area DA and first non-display area NDA-1 of the second sealing layer L2. The step compensating layer SCL-4 may reduce a lifting phenomenon of the second sealing layer L2 at a boundary between the display area DA and first non-display area NDA-1 of the second sealing layer L2. Accordingly, a display panel DP with improved reliability may be provided. In addition, the step is relieved to widen choice of the materials constituting the second sealing layer L2. The second sealing layer L2 may be selected to include a material capable of improving light efficiency and luminance.

Figure 10:
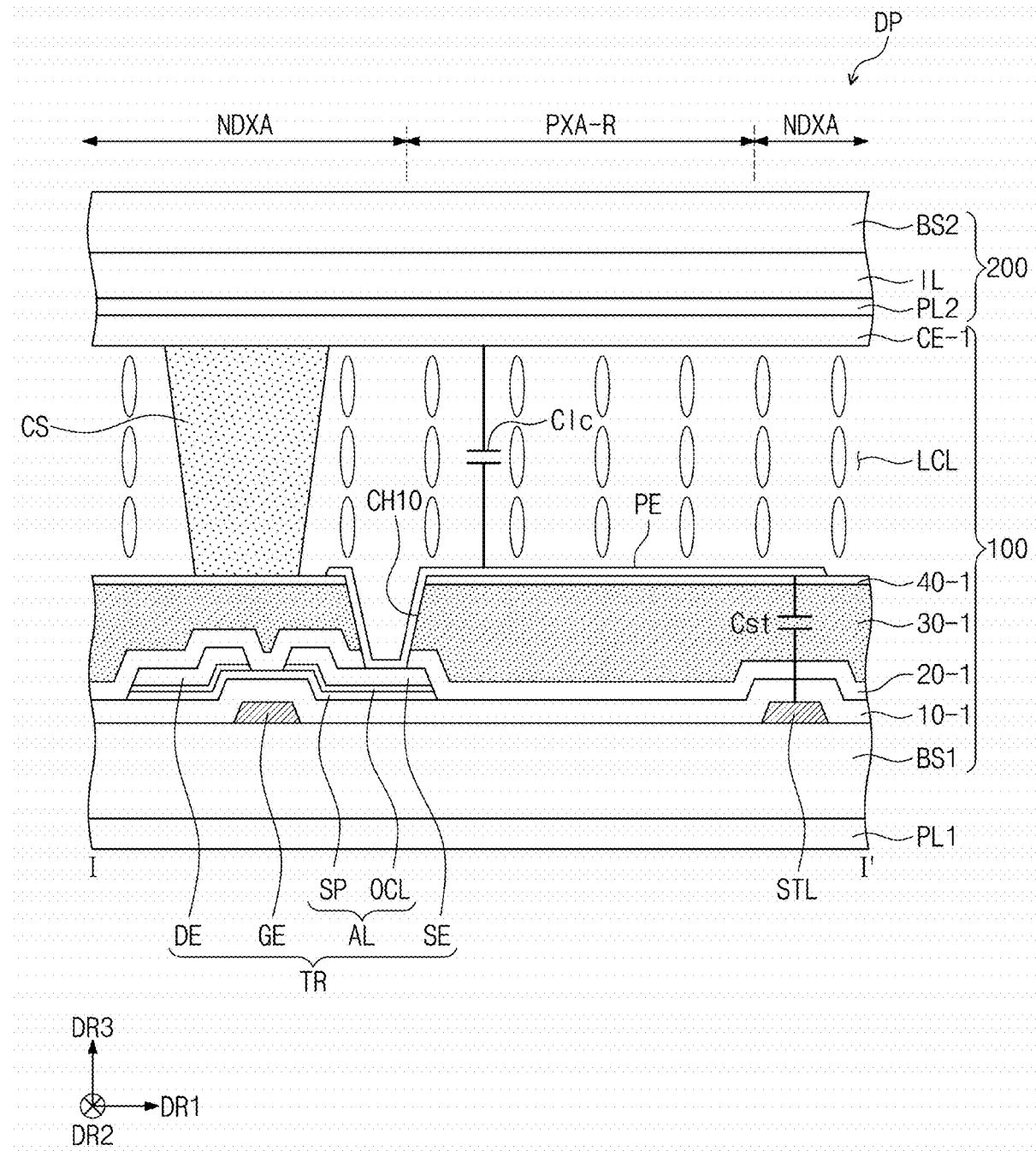
FIG. 10 is a cross-sectional view of an exemplary embodiment of a display panel taken along line corresponding to I-I' illustrated in FIG. 3 according to the invention.

FIG. 10 is a cross-sectional view of an exemplary embodiment of a display panel taken along line corresponding to I-I' illustrated in FIG. 3 according to the invention.

Referring to FIG. 10, the display panel DP may be a liquid crystal display panel. A pixel of the display panel DP may include a transistor TR, a liquid crystal capacitor Clc, and a storage capacitor Cst in an equivalent circuit.

The display panel DP may include a first substrate 100 and a second substrate 200.

The display panel DP may include a first polarizer layer PL1 and a second polarizer layer PL2. The first polarizer layer PL1 may be disposed under the first substrate 100. The second polarizer layer PL2 may constitute the second substrate 200. The second polarizer layer PL2 may include a wire grid.

A control electrode GE and a storage line STL may be disposed on one surface of a first base layer BS1. The first base layer BS1 may be a glass substrate or a plastic substrate. A first insulating layer 10-1 covering the control electrode GE and the storage line STL may be disposed on one surface of the first base layer BS1. An activation unit AL overlapping the control electrode GE may be disposed on the first insulating layer 10-1. The activation unit AL may include a semiconductor layer SP and an ohmic contact layer OCL. The semiconductor layer SP may be disposed on the first insulating layer 10-1 and the ohmic contact layer OCL may be disposed on the semiconductor layer SP.

The semiconductor layer SP may include amorphous silicon or polysilicon. In addition, the semiconductor layer SP may include a metal oxide semiconductor. The ohmic contact layer OCL may include a dopant doped with a higher density than the semiconductor layer. The ohmic contact layer OCL may include two portions which are spaced apart from each other. In an exemplary embodiment of the invention, the ohmic contact layer OCL may have an integral shape.

An input electrode DE and an output electrode SE may be disposed on the activation unit AL. The input electrode DE and the output electrode SE may be spaced apart from each other. A second insulating layer 20-1 covering the activation unit AL, the input electrode DE, and the output electrode SE may be disposed on the first insulating layer 10-1. A third insulating layer 30-1 may be disposed on the second insulating layer 20-1. The second insulating layer 20-1 and the third insulating layer 30-1 may include at least one of an inorganic material or an organic material. The third insulating layer 30-1 may be disposed on the second insulating layer 20-1. The third insulating layer 30-1 may be an organic layer providing a flat surface. A fourth insulating layer 40-1 may be disposed on the third insulating layer 30-1. The fourth insulating layer 40-1 may be an inorganic layer.

A pixel electrode PE may be disposed on the fourth insulating layer 40-1. The pixel electrode PE may be connected to the output electrode SE via a contact-hole CH10 passing through the second insulating layer 20-1, third insulating layer 30-1, and fourth insulating layer 40-1. An alignment film covering the pixel electrode PE may be disposed on the fourth insulating layer 40-1.

The second base layer BS2 may be a glass substrate or a plastic substrate. An intermediate layer IL, a second polarizer layer PL2, and a common electrode CE-1 may be disposed on a lower surface of the second base layer BS2. The liquid crystal layer LCL may operate by charging or discharging the liquid crystal capacitor Clc, and the source light generated from the backlight unit may pass through the first polarizer layer PL1, the liquid crystal layer LCL, and the second polarizer layer PL2 to be selectively provided to the intermediate layer IL.

In the exemplary embodiment, the intermediate layer IL is illustrated briefly, but the intermediate layer IL may have a laminated structure disposed on a lower surface of the second base layer BS2 which has been described with reference to FIGS. 5 to 9. The illustrated exemplary embodiment describes that the liquid crystal layer LCL and the common electrode CE-1 may constitute the first substrate 100, but the invention is not limited thereto, and in another exemplary embodiment of the invention, the liquid crystal layer LCL may be considered with a configuration different from the first substrate 100 and second substrate 200. In an exemplary embodiment, the display panel DP may further include column spacers CS in the liquid crystal layer LCL.

The cross-section illustrated in FIG. 10 is only one example. In FIG. 10, a liquid crystal display panel of a vertical alignment ("VA") mode is exemplarily described, but in an exemplary embodiment of the invention, a liquid crystal display panel of an in-plane switching ("IPS") mode, a fringe-field switching ("FFS") mode, a plane to line switching ("PLS") mode, a super vertical alignment ("SVA") mode, or a surface stabilized vertical alignment ("SS-VA") mode may also be applied thereto.

In the liquid crystal display panel of an IPS mode, a FFS mode, or a PLS mode, the common electrode CE-1 may be disposed on the first base layer BS1.

According to the exemplary embodiments of the invention, a step compensating layer may be disposed in a non-display area of a display panel. A sealing layer may cover a color filter layer and a color control layer. The step compensating layer may relieve a stress caused by a step difference at a boundary between display area and non-display area of the sealing layer. The step compensating layer may reduce a lifting phenomenon of the second sealing layer at a boundary between the display area and non-display area. Accordingly, a display panel with improved reliability may be provided.

Although the exemplary embodiments of the invention have been described, it is understood that the invention should not be limited to these exemplary embodiments but various changes and modifications may be made by one ordinary skilled in the art within the spirit and scope of the invention as hereinafter claimed and equivalents thereof.

What is claimed is:

1. A display panel comprising:
   a first substrate which includes a display device; and
   a second substrate which is disposed on the first substrate, the second substrate comprising:
   a base layer which includes a display area and a non-display area adjacent to the display area,
   a color filter layer which overlaps the display area in a plan view, and is disposed under the base layer,
   a first sealing layer which covers the color filter layer,
   a color control layer which overlaps the display area in the plan view, and is disposed under the first sealing layer,
   a step compensating layer which overlaps the non-display area in the plan view, and is disposed under the base layer, and
   a second sealing layer which covers the color control layer and the step compensating layer.

2. The display panel of claim 1, wherein the color filter layer comprises a first color filter layer, a second color filter layer, and a third color filter layer.

3. The display panel of claim 2, wherein the step compensating layer comprises a same material as any one of materials of the first to third color filter layers.

4. The display panel of claim 2, wherein the color control layer comprises a first wavelength conversion layer including a first emitting material, a second wavelength conversion layer including a second emitting material, and a transmission layer.

5. The display panel of claim 4, wherein the step compensating layer comprises a same material as any one of materials of the first wavelength conversion layer and the second wavelength conversion layer.

6. The display panel of claim 5, wherein the step compensating layer is spaced apart from the color control layer.

7. The display panel of claim 4, wherein the step compensating layer comprises a first layer disposed under the base layer and a second layer disposed under the first layer.

8. The display panel of claim 7, wherein a width of the first layer is greater than a width of the second layer.

9. The display panel of claim 7, wherein the first layer comprises a same material as any one of materials of the first to third color filter layers, and the second layer comprises a same material as another one of the materials of the first to third color filter layers.

10. The display panel of claim 7, wherein the first layer comprises a same material as any one of materials of the first to third color filter layers, and the second layer comprises a same material as any one of materials of the first and second wavelength conversion layers.

11. The display panel of claim 10, wherein the first sealing layer is disposed between the first layer and the second layer.

12. The display panel of claim 1, wherein the second substrate further comprises a first light blocking layer which overlaps the non-display area in the plan view, and is disposed under the second sealing layer.

13. The display panel of claim 12, wherein the second substrate further comprises a second light blocking layer which overlaps the display area in the plan view, and is disposed under the second sealing layer.

14. The display panel of claim 1, wherein the step compensating layer is disposed between the first sealing layer and the second sealing layer.

15. The display panel of claim 1, wherein the step compensating layer is disposed between the first sealing layer and the base layer.

16. The display panel of claim 1, wherein the step compensating layer is covered by the first sealing layer and the second sealing layer.

17. The display panel of claim 1, wherein a maximum distance from the base layer to the second sealing layer in the display area is longer than a maximum distance from the base layer to the second sealing layer in the non-display area.

18. The display panel of claim 1, further comprising a light blocking portion disposed between the step compensating layer and the base layer.

* * * * *